(12) United States Patent
Zhao

(10) Patent No.: US 9,319,508 B2
(45) Date of Patent: Apr. 19, 2016

(54) METHOD AND DEVICE FOR ADDING MENU ITEM TO ANDROID MENU

(71) Applicant: Huawei Device Co., Ltd., Shenzhen (CN)

(72) Inventor: Jing Zhao, Beijing (CN)

(73) Assignee: Huawei Device Co., Ltd., Shenzhen (CN)

(*) Notice: Subject to any disclaimer, the term of this patent is extended or adjusted under 35 U.S.C. 154(b) by 173 days.

(21) Appl. No.: 13/676,782

(22) Filed: Nov. 14, 2012

(65) Prior Publication Data

US 2013/0074010 A1 Mar. 21, 2013

Related U.S. Application Data

(63) Continuation of application No. PCT/CN2011/073864, filed on May 11, 2011.

(30) Foreign Application Priority Data

May 14, 2010 (CN) .......................... 2010 1 0176312

(51) Int. Cl.
G06F 3/048 (2013.01)
H04M 1/725 (2006.01)
G06F 9/44 (2006.01)

(52) U.S. Cl.
CPC ......... *H04M 1/72525* (2013.01); *G06F 9/4443* (2013.01); *H04M 1/72583* (2013.01)

(58) Field of Classification Search
None
See application file for complete search history.

(56) References Cited

U.S. PATENT DOCUMENTS

| 5,826,051 A * | 10/1998 | Porter et al. .................. 715/810 |
| 7,213,241 B2 | 5/2007 | Cheng |
| 7,590,430 B1 * | 9/2009 | Urbanek ............. G06F 9/44505 345/168 |
| 2003/0103088 A1 * | 6/2003 | Dresti ................... G06F 3/0481 715/835 |

(Continued)

FOREIGN PATENT DOCUMENTS

| CN | 1581800 A | 2/2005 |
| CN | 1859474 A | 11/2006 |

(Continued)

OTHER PUBLICATIONS

Written Opinion of the International Searching Authority issued in corresponding PCT Patent Application No. PCT/CN2011/073864, mailed Aug. 11, 2011.

(Continued)

*Primary Examiner* — Matt Kim
*Assistant Examiner* — Tuan S Nguyen
(74) *Attorney, Agent, or Firm* — Huawei Technologies Co., Ltd

(57) ABSTRACT

A method and device for adding a menu item to an Android menu are provided. The method includes: receiving a request for opening a local menu, where the request carries a menu ID, and creating a local menu corresponding to the menu ID; obtaining according to the menu ID, in a stored correspondence between a menu item of a third-party application and the menu ID, a menu item of a corresponding third-party application; and adding the menu item of the third-party application to the local menu, and displaying the local menu to which the menu item of the third-party application is added. The device includes a first creating module, an obtaining module, and an adding module. The present invention is capable of adding a menu item of a third-party application to a local menu of a mobile phone without modifying an Android platform code.

15 Claims, 4 Drawing Sheets

(56) References Cited

U.S. PATENT DOCUMENTS

| | | | |
|---|---|---|---|
| 2005/0273729 A1* | 12/2005 | Kumashio | 715/825 |
| 2007/0028231 A1 | 2/2007 | Kelso et al. | |
| 2007/0050733 A1 | 3/2007 | Lee et al. | |
| 2008/0153473 A1 | 6/2008 | Lorenzo et al. | |
| 2009/0144659 A1 | 6/2009 | Do | |
| 2009/0158213 A1 | 6/2009 | Ryu | |
| 2010/0050128 A1* | 2/2010 | Chiang et al. | 715/847 |
| 2011/0153629 A1* | 6/2011 | Lehmann et al. | 707/758 |

FOREIGN PATENT DOCUMENTS

| | | | |
|---|---|---|---|
| CN | 101004675 A | | 7/2007 |
| CN | 101080075 A | | 11/2007 |
| CN | 101222710 A | | 7/2008 |
| CN | 101246424 A | | 8/2008 |
| CN | 101557431 A | | 10/2009 |
| CN | 101699396 A | | 4/2010 |
| CN | 101833467 A | | 9/2010 |
| WO | 2008082360 A1 | | 7/2008 |

OTHER PUBLICATIONS

International Search Report issued in corresponding PCT Patent Application No. PCT/CN2011/073864, mailed Aug. 11, 2011.

Office Action issued in corresponding Chinese Patent Application No. 201010176312.X, mailed Dec. 19, 2011.

Office Action issued in corresponding Chinese Patent Application No. 201010176312.X, mailed Jul. 3, 2012.

Search Report issued in corresponding Chinese Patent Application No. 201010176312.X, mailed Oct. 11, 2011.

Ang Lu'e, "Creating a More Flexible Dynamic Menu" Microcomputer Applications, vol. 16, No. 7, 2000.

Jiang et al., "Automatic Creation and Management of Dynamic Menus and Windows" Computer Engineering & Science, vol. 24, No. 4, 2002.

Search report issued in corresponding European patent application No. 11780189.4, dated Jul. 10, 2013, total 6 pages.

"Scripting guide", Adobe photoshop CS3, 2007, total 85 pages.

* cited by examiner

| X | Write Message |
|---|---|
| J | Receive Message |
| F | Send Message |
| Q | Empty |

FIG. 3

| X | Write Message |
|---|---|
| J | Receive Message |
| F | Send Message |
| Q | Empty |
| M | Mail |

FIG. 4

| Inbox |
|---|
| Outbox |
| Draft |

FIG. 5

| Inbox |
|---|
| Outbox |
| Draft |
| DirectMessage |

FIG. 6

METHOD AND DEVICE FOR ADDING MENU ITEM TO ANDROID MENU

CROSS-REFERENCE TO RELATED APPLICATIONS

This application is a continuation of International Application No. PCT/CN2011/073864, filed on May 10, 2011, which claims priority to Chinese Patent Application No. 201010176312.X, filed on May 14, 2010, both of which are hereby incorporated by reference in their entireties.

FIELD OF THE INVENTION

The present invention relates to the computer field, and in particular, to a method and device for adding a menu item to an Android menu.

BACKGROUND OF THE INVENTION

Android is a software platform and operating system based on the Linux kernel. Android provides multiple functions and multiple local menus, where each local menu includes one or multiple menu items, and each menu item corresponds to a function, so that each function may be started from the local menus. Android may be used as a mobile operating system. A mobile phone manufacturer adds various third-party applications to the Android platform to develop mobile phones with different functions. Each third-party application includes one or multiple functions, and each function corresponds to one menu item. The menu item corresponding to each function of a third-party application is added to a local menu, so that the functions included in the third-party application may be started from the local menu.

The Android platform has a database for storing menu items. A mobile phone manufacturer adds a menu item included in a third-party application to the database by modifying a code in the Android platform. When a local menu is created, menu items are obtained from the database to make a local menu, thereby adding the menu item included in the third-party application to the local menu. Then, the mobile phone manufacturer burns the Android platform and the third-party application into the memory of the mobile phones.

The inventors find that the prior art has at least the following problems:

When a mobile phone manufacturer adds a menu item of a third-party application to a local menu, the mobile phone manufacturer needs to modify an Android code. In addition, after a mobile phone is delivered from a factory, data burned into the mobile phone memory cannot be modified again. Therefore, when downloading a third-party application to the mobile phone, the user cannot add a menu item in the third-party application to the local menu of the mobile phone.

SUMMARY OF THE INVENTION

To add a menu item of a third-party application to a local menu of a mobile phone without modifying an Android platform code, embodiments of the present invention provide a method and device for adding a menu item to an Android menu. The technical solutions are as follows:

A method for adding a menu item to an Android menu includes:

receiving a request for opening a local menu, where the request carries a menu ID, and creating a local menu corresponding to the menu ID;

obtaining according to the menu ID, in a stored correspondence between a menu item of a third-party application and a local menu ID, a menu item of a corresponding third-party application;

adding the menu item of the third-party application to the local menu; and displaying the local menu to which the menu item of the third-party application is added.

A device for adding a menu item to an Android menu includes:

a first creating module, configured to receive a request for opening a local menu, where the request carries a menu ID, and create a local menu corresponding to the menu ID;

an obtaining module, configured to obtain according to the menu ID, in a stored correspondence between the menu item of a third-party application and a local menu ID, a menu item of a corresponding third-party application; and an adding module, configured to, add the menu item of the third-party application to the local menu, and display the local menu to which the menu item of the third-party application is added.

When a local menu is opened, a menu item to be added to the local menu is obtained from a stored correspondence between a menu item of a third-party application and a local menu ID, and the obtained menu item is directly added to the local menu. The menu item of the third-party application is directly added to the local menu, therefore, without modifying an Android code, the menu item of the third-party application may be added to the database of an Android platform and the menu item of the third-party application may be added to the local menu.

BRIEF DESCRIPTION OF THE DRAWINGS

The accompanying drawings described here describe the present invention more clearly, constitute a part of the present application, and are not intended to limit the present invention. In the accompanying drawings:

FIG. 3 is a schematic diagram of a first kind of a local primary menu according Embodiment 2 of the present invention;

FIG. 4 is a schematic diagram of a second kind of a local primary menu according Embodiment 2 of the present invention;

FIG. 5 is a schematic diagram of a first kind of a local secondary menu according Embodiment 2 of the present invention;

FIG. 6 is a schematic diagram of a second kind of a local secondary menu according Embodiment 2 of the present invention.

DETAILED DESCRIPTION OF THE EMBODIMENTS

To make the objective, technical solutions, and advantages of the present invention clearer, the following describes the present invention in detail with reference to embodiments and accompanying drawings. The illustrative embodiments of the present invention and description thereof are used to describe the present invention, and are not intended to limit the present invention.

Embodiment 1

Figure 1:
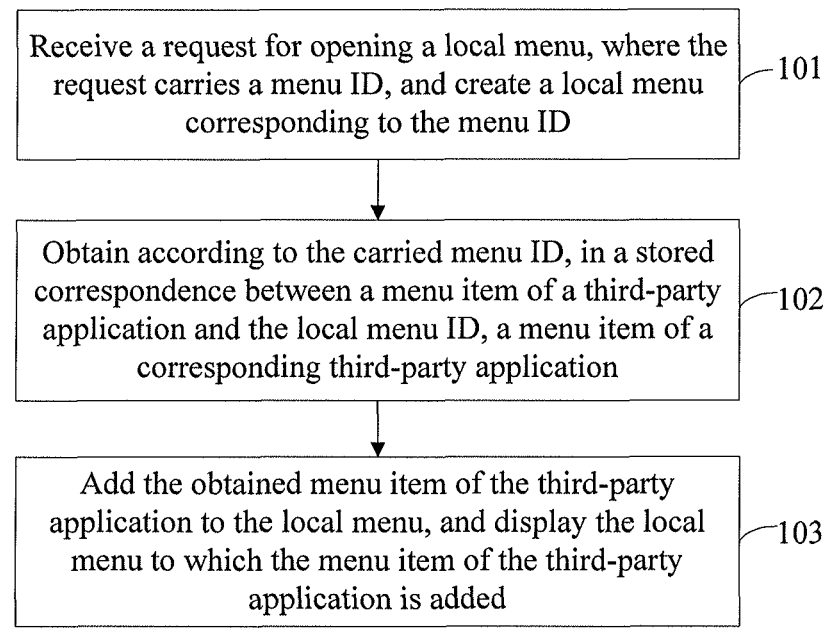
FIG. 1 is a flowchart of a method for adding a menu item to an Android menu according to Embodiment 1 of the present invention.

As shown in FIG. 1, an embodiment of the present invention provides a method for adding a menu item to an Android menu, including:

Step 101: Receive a request for opening a local menu, where the request carries a menu ID, and create a local menu corresponding to the carried menu ID.

Step 102: Obtain according to the carried menu ID, in a stored correspondence between a menu item of a third-party application and the local menu ID, a menu item of a corresponding third-party application.

Step 103: Add the obtained menu item of the third-party application to the local menu, and display the local menu to which the menu item of the third-party application is added.

In the embodiment of the present invention, a menu item of a third-party application and an ID of a local menu to which the menu item belongs are stored; when the local menu is opened, the menu item to be added to the local menu is obtained according to a stored correspondence between the menu item of the third-party application and the local menu ID, and the obtained menu item is directly added to the local menu. The menu item of the third-party application is directly added to the local menu, therefore, without modifying an Android code, the menu item of the third-party application may be added to the database of an Android platform and the menu item of the third-party application may be added to the local menu.

Embodiment 2

Figure 2:
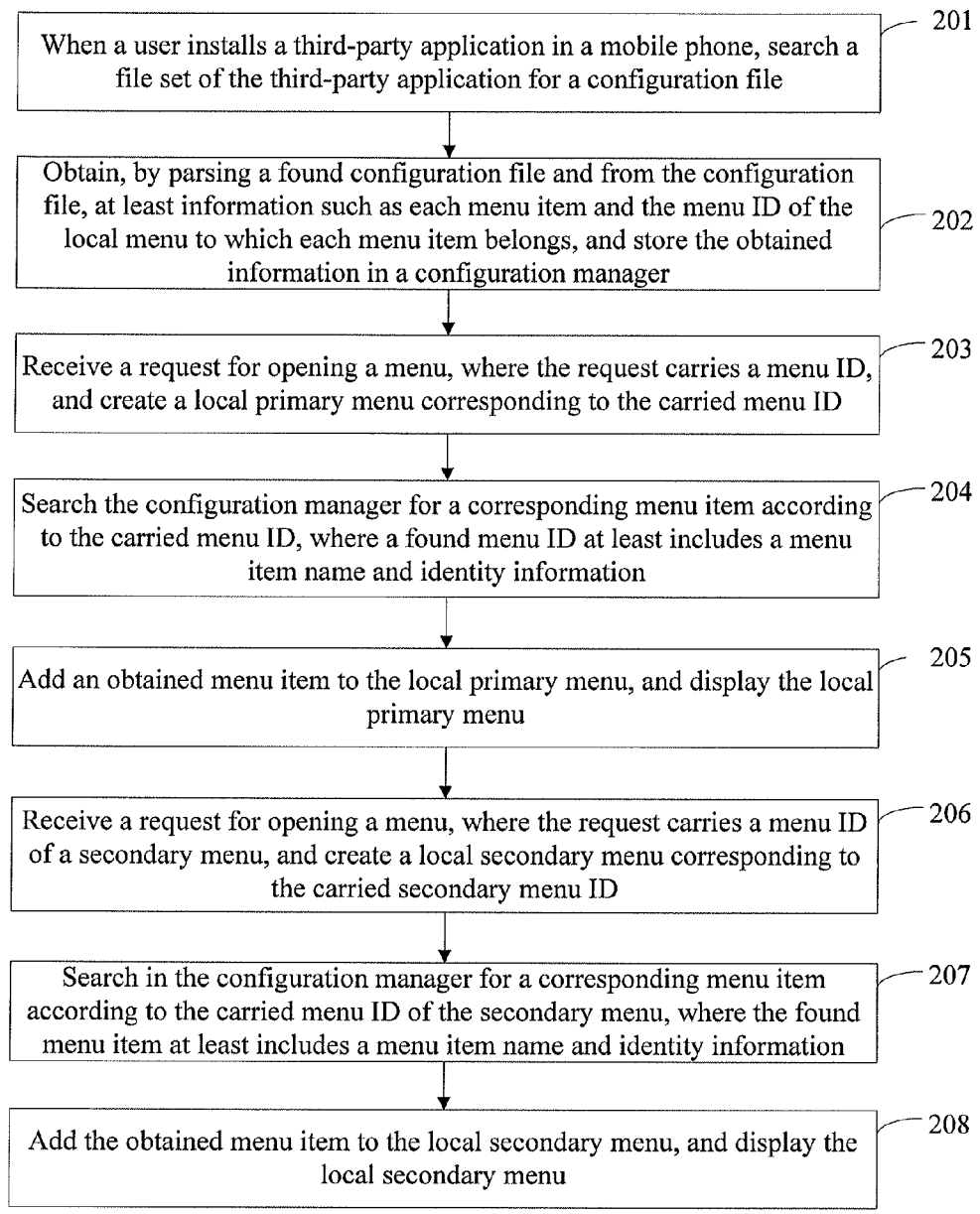
FIG. 2 is a flowchart of a method for adding a menu item to an Android menu according to Embodiment 2 of the present invention.

As shown in FIG. 2, an embodiment of the present invention provides a method for adding a menu item to an Android menu, including:

Step 201: When a user installs a third-party application in a mobile phone, search a file set of the third-party application for a configuration file.

The user may download the file set of the third-party application from an application developer, and store the file set of the third-party application in the memory of the mobile phone. The third-party application may include one or multiple functions, where each function is implemented by a corresponding API (Application Programming Interface) function. Therefore, the file set of the third-party application stores the API function of each function for implementing the third-party application.

The file set of the third-party application has a configuration file, where the configuration file exists as an XML (Extensible Markup Language) file. The configuration file includes at least the following information: a menu item and an ID of a local menu to which the menu item belongs, where the menu item includes at least a menu item name and identity information, and the identity information includes at least a menu ID of a secondary menu or a function ID. In addition, the identity information may further include an application ID. If the identity information includes a menu ID of a secondary menu, the identity information may uniquely identify a secondary menu; and if the identity information includes a function ID, the identity information may uniquely identify a function. In addition, the menu item may further include an icon ID, and the like, and correspondingly, the file set of the third-party application further has an icon. In addition, the menu item name exists in the form of a character string. The configuration file may include multiple menu items and IDs of local menus to which each menu item belongs. A third-party application developer knows each local menu in an Android platform in advance. If the third-party application developer wants to add a menu item of a third-party application to a local menu, the third-party application developer may directly define, in the configuration file of the third-party application, the local menu ID, to which the menu item of the third-party application belongs, to be the local menu ID.

For example, a third-party application is a mail system. A file set of the mail system has a configuration file, where the configuration file includes information shown in Table 1. As shown in Table 1, the configuration file of the mail system includes two menu items and IDs of local menus to which each menu item belongs. A first menu item includes a menu item name which is "Mail" and identity information which includes a function ID "ID101", an application ID "ID10", and an icon ID "ID102". A second menu item includes a menu item named "DirectMessage" and identity information including a function ID "ID103" and an application ID "ID10". A menu item may not include an icon ID. Therefore, an icon ID recorded in a last line of Table 1 is left blank.

TABLE 1

| Menu Item | | | | Local |
|---|---|---|---|---|
| Menu Item Name | Function ID | Application ID | Icon ID | Menu ID |
| Mail | ID101 | ID10 | ID102 | ID1 |
| DirectMessage | ID103 | ID10 | N/A | ID18 |

Step 202: Obtain, by parsing a found configuration file and from the configuration file, at least information such as each menu item and the menu ID of the local menu to which each menu item belongs, and store the obtained information in a configuration manager.

The configuration manager is stored in an unoccupied space area in the memory of a mobile phone, and the configuration manager is configured to store a correspondence between a menu item of a third-party application and a menu ID of a local menu to which the menu item belongs. For example, the configuration file shown in FIG. 1 is parsed to obtain, from the configuration file shown in Table 1, two menu items and IDs of the local menus to which each menu item belongs, and the obtained two menu items and the IDs of the local menus to which each menu item belongs are stored in a configuration manager shown in Table 2.

TABLE 2

| Configuration Manager | | | | |
|---|---|---|---|---|
| Menu Item | | | | Local |
| Menu Item Name | Function ID | Application ID | Icon ID | Menu ID |
| Mail | ID101 | ID10 | ID102 | ID1 |
| DirectMessage | ID103 | ID10 | N/A | ID18 |
| ... | ... | ... | ... | ... |

When producing a mobile phone, a mobile phone manufacturer normally sets multiple local applications in the mobile phone, where each local application includes multiple functions, and sets a corresponding local primary menu for each local application, where the local primary menu includes one or multiple menu items, and identity information of each menu item includes at least a function ID or a menu ID of a local secondary menu. The structure of a local secondary menu is the same as the structure of a local primary menu, and each local secondary menu may also include multiple menu items. In addition, the mobile phone manufacturer further sets a unique ID for identifying each local secondary menu and local primary menu. For the convenience of description, the local primary menu and the local secondary menu may be collectively referred to as a local menu.

The database in an Android platform of the mobile phone stores a correspondence between a menu ID of each local menu and each menu item included in the local menu. For example, a mobile phone includes local applications such as "Message", "Address Book", and "Setting", and each local application corresponds to a local primary menu. Table 3 shows a correspondence between a menu ID of a local primary menu corresponding to the local application "Message" and each menu item in the local primary menu. Each line of records in Table 3 includes a menu ID and a menu item. In Table 3, the menu item in each line of records includes a menu item name, identity information, and an icon ID, where the identity information may include two fields, namely, a function ID and a secondary menu ID. The identity information in each line of the records from line 2 to line 4 includes a function ID only, and the secondary menu ID is left blank. The identity information in the record in line 5 includes a secondary menu ID only, and the function ID is left blank.

TABLE 3

| Menu ID | Menu Item | | | |
|---------|-----------|---|---|---|
| | Menu Item Name | Function ID | Secondary Menu ID | Icon ID |
| ID1 | Write Message | ID10 | N/A | ID11 |
| ID1 | Inbox | ID12 | N/A | ID13 |
| ID1 | Outbox | ID14 | N/A | ID15 |
| ID1 | Empty | N/A | ID18 | ID17 |

In Table 3, the menu item of the record in line 5 includes a secondary menu ID "ID18", indicating that the menu item corresponds to a local secondary menu whose ID is "ID18". The structure of the local secondary menu is the same as that of the local primary menu, which also includes multiple menu items. As shown in Table 4, the mobile phone manufacturer also sets, for the local secondary menu, a correspondence between a menu ID and each menu item included in the local secondary menu.

TABLE 4

| Menu ID | Menu Item | | | |
|---------|-----------|---|---|---|
| | Menu Item Name | Function ID | Icon ID | Secondary Menu ID |
| ID18 | Inbox | ID19 | N/A | N/A |
| ID18 | Outbox | ID20 | N/A | N/A |
| ID18 | Draft | ID21 | N/A | N/A |

The mobile phone manufacturer stores Table 3 and Table 4 in the database of the Android platform. When producing the mobile phone, the mobile phone manufacturer burns the correspondences between the menu items and the menu IDs stored in the database of the Android platform, together with each local application, into the memory of the mobile phone. Therefore, in the memory of the mobile phone, the database of the Android platform and the configuration manager are located in different storage space respectively.

On a desktop of the mobile phone, the mobile phone manufacturer creates an icon for each local application, and binds an icon corresponding to each local application with a menu ID of the local primary menu corresponding to the local application. A user submits a request for opening a menu by selecting an icon, where the request carries the menu ID which is bound with the icon. Then, the following steps 203 to 206 are performed to create the local primary menu corresponding to the menu ID carried in the request.

Step 203: Receive the request for opening the menu, where the request carries the menu ID, and create the local primary menu corresponding to the carried menu ID.

Specifically, the request for opening the menu is received; a menu list is created; all corresponding menu items are obtained, according to the menu ID carried in the request for opening the menu, in the correspondence between the menu item and the menu ID stored in the database of the Android platform; the menu item name included in each menu item is filled in the created menu list; and in the menu list, the menu item name and the identity information in each menu item are bound, and thereby the local primary menu is obtained.

Further, if a menu item further includes an icon ID, a corresponding icon is obtained in the memory of the mobile phone according to the icon ID, and correspondingly, the obtained icon, together with the menu item name in the menu item, is filled in the created menu list.

For example, a request for opening a menu is received, where a menu ID carried in the request is ID1; a menu list is created; and in the Table 3 stored in a database of an Android platform, all corresponding menu items are obtained according to the ID1 carried in the request. As shown in Table 5, each menu item includes an icon ID.

TABLE 5

| Menu Item | | | |
|-----------|---|---|---|
| Menu Item Name | Icon ID | Function ID | Secondary Menu ID |
| Write Message | ID11 | ID10 | N/A |
| Inbox | ID13 | ID12 | N/A |
| Outbox | ID15 | ID14 | N/A |
| Empty | ID17 | N/A | ID18 |

In a memory of the mobile phone, a corresponding icon is obtained according to an icon ID in each menu item; the menu item name and corresponding icon in each menu item are filled in the menu list; and in the menu list, the menu item name and identity information included in each menu item are bound, and thereby a local primary menu shown in FIG. 3 is obtained. For example, the menu item shown in line 3 in Table 5 includes the menu item name "Write Message", a function "ID10" included in the identity information, and an icon ID "ID11". The corresponding icon is obtained according to the icon ID11; the menu item name "Write Message" in the menu item and the obtained icon are filled in the menu list; and the "Write Message" in the menu item is bound with the function "ID10".

The created menu list has only one blank table, and each time a menu item name is filled in the blank table, another blank table is automatically created for the menu list. Therefore, the menu list always has one blank table. Alternatively, two or more blank tables may be retained.

Step 204: Search the configuration manager for a corresponding menu item according to the carried menu ID, where a found menu item includes at least a menu item name and identity information.

All menu items found in the configuration manager are menu items of a third-party application. For example, the configuration manager shown in Table 2 is searched for a corresponding menu item according to a carried ID1, where the found menu item includes a menu item name "Mail" and identity information which includes an application ID "ID10" and a function ID "ID101". The menu item is a menu item of the third-party application "Mail System".

Step 205: Add an obtained menu item to the local primary menu, and display the local primary menu.

Specifically, in the menu list of the local primary menu, the menu name included in the obtained menu item is filled in an unoccupied table respectively; the menu item name and identity information in the obtained menu item are bound in the local primary menu; and then the local primary menu is displayed. The unoccupied table refers to the preceding blank table.

Further, if the obtained menu item further includes an icon ID, a corresponding icon is obtained from a file set of a third-party application installed on the mobile phone, and correspondingly, the icon and the menu item name of the menu item are filled in the unoccupied table in the menu list of the local primary menu.

For example, according to an icon ID "ID102", the file set of the third-party application installed in the mobile phone is searched for the corresponding icon; and the menu item name "Mail" in the menu item and the found icon are filled in the menu item list; the identity information in the menu item and the menu item name "Mail" are bound in the menu list, that is, the application "ID10" and the function "ID101" are both bound to the menu item name "Mail", and thereby the local primary menu shown in FIG. 4 is obtained.

In this embodiment, unoccupied space is retained in the memory of the mobile phone, where the space is used to store a menu item of a third-party application and an ID of the local menu to which the menu item belongs. Therefore, it is not necessary to modify an Android code to store the menu item of the third-party application and the ID of the local menu to which the menu item belongs in the database of Android. When a user needs to open a local primary menu, a local primary menu needs to be opened by the user is created first, and then a menu item of a third-party application is directly added to the local primary menu, and thereby the menu item of the third-party application is added to the local primary menu.

Further, when the user selects a menu item in the displayed local primary menu, the background color of the menu item selected by the user is changed to a specific background color.

For example, the local primary menu shown in FIG. 4 may be displayed for the user. When the user selects a menu item in the local primary menu, the local primary menu obtains identity information of the menu item name which is bound in the menu item. If the obtained identity information includes a function ID only, the memory of the mobile phone is searched for a corresponding function according to the obtained function ID, that is, an API function for implementing the function is searched for, and then the found function is directly invoked. If the obtained identity information includes an application ID and a function ID, the memory of the mobile phone is searched for a file set corresponding to the application according to the application ID, and the found file set is searched for a corresponding function according to the function ID, and then the found function in invoked. If the obtained identity information includes a secondary menu ID, a request for opening a menu is generated, where the request carries an obtained secondary menu ID; the request for opening the menu is submitted; and then according to the following steps 206 to 208, a secondary menu is created and displayed.

Step 206: Receive a request for opening a menu, where the request carries a menu ID of a secondary menu, and create a local secondary menu corresponding to the carried secondary menu ID.

Specifically, the request for opening the menu is received; a menu list is created; all corresponding menu items are obtained, according to the menu ID carried in the request for opening the menu, in the correspondence between the menu item and the menu ID in the Android database of the mobile phone; the menu item name included in each menu item is filled in the created menu list; and in the menu list, the menu item name and the identity information in each menu item are bound, and thereby the local secondary menu is obtained.

Further, if a menu item further includes an icon ID, a corresponding icon is obtained in the memory of the mobile phone according to the icon ID; and the obtained icon, together with the menu item name in the menu item, is filled in the created menu list.

For example, in the menu list shown in FIG. 4, after a user selects "Empty", a request for opening a menu is received, where the request for opening the menu carries a menu ID ID18; a menu list is created; and the Table 4 stored in the database of Android is searched for all corresponding menu items according to the carried ID18, as shown in Table 6.

TABLE 6

| Menu Item | |
|---|---|
| Menu Item Name | Function ID |
| Inbox | ID19 |
| Outbox | ID20 |
| Draft | ID21 |

The menu item names "Inbox," "Outbox," and "Draft" shown in FIG. 6 are filled in the created menu list; in the menu list, "Inbox" and "ID19" are bound, "Outbox" and "ID20" are bound, and "Draft" and "ID21" are bound, and thereby the local secondary menu shown in FIG. 5 is obtained. Certainly, when the secondary menu is created, at least one blank table may always be retained in the created menu list as described in step 203.

Step 207: The configuration manager is searched for a corresponding menu item according to the carried menu ID of the secondary menu, where the found menu item includes at least a menu item name and identity information.

For example, a configuration manager such as the one shown in Table 2 is searched for a corresponding menu item according to the carried ID18, where the menu item includes a menu item name "DirectMessage" and identity information which includes a function ID "ID103" and an application ID "ID10."

Step 208: Add the obtained menu item to the local secondary menu, and display the local secondary menu.

Specifically, the menu name included in the obtained menu item is filled in an unoccupied table in the menu list of the local secondary menu; the menu item name and identity information in the obtained menu item are bound in the local secondary menu; and then the local secondary menu is displayed.

For example, the obtained menu item name "DirectMessage" is filled in the unoccupied table of the menu list of the local secondary menu; the menu item name of the menu item and the function ID "ID103" are bound in the local secondary menu, and thereby the local secondary menu shown in FIG. 6 is obtained; and then the local secondary menu shown in FIG. 6 is displayed.

In the embodiment, when a user needs to open a local secondary menu, a local secondary menu needs to be opened by the user is created first, and then a menu item of a third-party application is directly added to the local secondary menu, and thereby the menu item of the third-party application is added to the local secondary menu.

The mobile phone manufacturer sets an XSD (XML Schemas Definition) specification in the mobile phone, where the structure of each local menu in the mobile phone is defined in an XSD specification. Further, after step 201 is performed and before step 202 is performed, the found configuration file may be verified according to the XSD specification in the mobile phone; if the verification is passed, step 202 is performed; otherwise, the operation ends. For example, assume that a local menu is defined in the XSD and no new menu item is allowed to be added, but a found configuration file has a menu item to be added to the local menu, when the found configuration file is being verified by using the XSD specification, a result of verification failure is obtained, and the operation ends.

In this embodiment, in the process of adding a menu item of a third-party application, the code in the Android platform of a mobile phone is not modified. Therefore, every local application in the mobile phone is not damaged. When the third-party application needs to communicate information to the local application, the third-party application needs to first submit, to the Android platform, the information to be communicated, and the Android platform receives the information to be communicated and forwards, to the local application, the information to be communicated.

The method provided in this embodiment is capable of adding a menu item of a third-party application to a local menu in any terminal device supporting an Android platform.

In the embodiment of the present invention, a menu item of a third-party application and an ID of a local menu to which the menu item belongs are stored in a configuration manager. When a local menu is created, the menu item of the third-party application to be added to the local menu is obtained from the configuration manager, and the obtained menu item is added to the local menu. The menu item of the third-party application and the ID of the local menu to which the menu item belongs are stored in the configuration manager; therefore, the menu item of the third-party application may be added to the database of Android without modifying an Android code. The menu item of the third-party application is directly added to the local menu, and thereby the menu item of the third-party application is added to the local menu.

Embodiment 3

Figure 7:
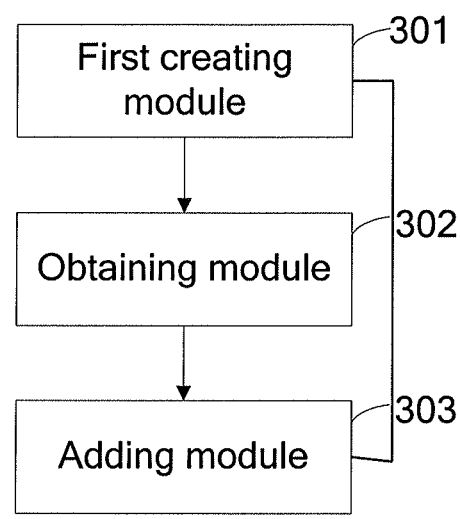
FIG. 7 is a schematic diagram of a device for adding a menu item to an Android menu according to Embodiment 3 of the present invention.

As shown in FIG. 7, an embodiment of the present invention provides a device for adding a menu item to an Android menu, including:

a first creating module 301, configured to receive a request for opening a local menu, where the request carries a menu ID, and create a local menu corresponding to the menu ID;

an obtaining module 302, configured to obtain according to the menu ID, in a stored correspondence between the menu item of a third-party application and a local menu ID, a menu item of a corresponding third-party application; and an adding module 303, configured to add the obtained menu item of the third-party application to the local menu, and display the local menu to which the menu item of the third-party application is added;

where the obtained menu item of the third-party application includes at least a menu item name and identity information; and correspondingly, the adding module 303 specifically includes:

a filling unit, configured to: in a menu list of local menus, fill an unoccupied table in the menu list with the menu item name of the obtained menu item of the third-party application;

a binding unit, configured to bind the menu item name of the menu item of the third-party application with the identity information, where the identity information is used to identify a function or a secondary menu; and a first displaying unit, configured to display the local menu to which the menu item of the third-party application is added.

If the obtained menu item of the third-party application further includes an icon ID, the adding module 303 further includes:

a searching unit, configured to search a file set of the third-party application for an icon corresponding to the icon ID.

Correspondingly, the filling unit is specifically configured to fill an unoccupied table in the menu list with the menu item name of the menu item of the third-party application and a found icon.

Further, the device includes:

a storing module, configured to search a file set of the third-party application for a configuration file; obtain, by parsing the configuration file, the menu item of the third-party application and the local menu ID to which the menu item belongs; and store the menu item of the third-party application and the local menu ID to which the menu item belongs in unoccupied space.

Further, the device includes:

a verifying module, configured to: after the storing module finds the configuration file, verify the configuration file according to a defined structure of local menus.

Further, the device includes:

a first obtaining module, configured to: when a user selects a menu item in the local menu to which the menu item of the third-party application is added, obtain the identity information bound with the menu item name in the selected menu item;

a second obtaining module, configured to: if the obtained identity information includes a function ID, obtain a corresponding function according to the function ID; and a second creating module, configured to: if the obtained identity information includes a secondary menu ID, create a secondary menu corresponding to the secondary menu ID.

The second creating module specifically includes:

a creating unit, configured to create a local secondary menu corresponding to the secondary menu ID;

an obtaining unit, configured to obtain according to the secondary menu ID, in the stored correspondence between the menu item of the third-party application and the local menu ID, a menu item of a corresponding third-party application;

an adding unit, configured to add the menu item of the third-party application to the local secondary menu; and a second displaying unit, configured to display the local secondary menu to which the menu item of the third-party application is added.

The device may be a mobile phone where an Android platform is installed or a terminal device supporting the Android platform.

In the embodiment of the present invention, a menu item of a third-party application and an ID of a local menu to which the menu item belongs are stored in a configuration manager. When a local menu is created, the menu item of the third-party application that needs to be added to the local menu is obtained from the configuration manager, and the obtained menu item is added to the local menu. The menu item of the third-party application and the ID of the local menu to which the menu item belongs are stored in the configuration manager; therefore, the menu item of the third-party application may be added to the database of Android without modifying an Android code. The menu item of the third-party application is directly added to the local menu, and thereby the menu item of the third-party application is added to the local menu.

Persons skilled in the art may understand that all or part of the steps of the various methods according to the embodiments may be implemented by a program instructing relevant hardware. The program may be stored in a computer readable storage medium, and the storage medium may include a ROM, a RAM, a magnetic disk, or a CD-ROM, and so on.

The above specific embodiments further describe the objective, technical solutions, and benefits of the present invention in detail. It should be understood that the above are merely exemplary embodiments of the present invention, and are not intended to limit the protection scope of the present invention. Any modifications, equivalent replacements, and improvements made without departing from the spirit and principle of the present invention shall fall within the protection scope of the present invention.

The invention claimed is:

1. A method for displaying a menu of a first application in a mobile device, wherein the first application is configured to be associated with a second application, the method comprising:
   receiving a request for launching the first application at a user interface of the mobile device;
   generating the menu of the first application; and
   displaying the menu of the first application on a display unit of the mobile device;
   wherein the menu of the first application comprises a menu item representing the second application, and generating the menu of the first application comprises:
   adding the menu item representing the second application to a preexisting menu of the first application according to a first correspondence between a menu identifier (ID) identifying the preexisting menu of the first application and the menu item representing the second application,
   wherein the first correspondence is configured in the mobile device according to a configuration file provided by the second application when the second application is installed in the mobile device, and
   wherein the configuration file provided by the second application comprises the menu ID for identifying the preexisting menu of the first application.

2. The method of claim 1, wherein the menu item representing the second application comprises an item name.

3. The method of claim 2, wherein the item name in the menu item representing the second application is associated with an identifier for identifying a function of the second application or a secondary menu.

4. The method of claim 3, wherein the item name in the menu item representing the second application is associated with an icon ID for identifying an icon of the second application.

5. The method of claim 3, wherein the identifier associated with the item name is a function identifier (ID), the function ID is associated with a function of the second application, and wherein the method further comprises:
   detecting a selection of the item name on the menu of the first application;
   obtaining the function ID associated with the item name; and
   launching the function of the second application associated with the function ID.

6. The method of claim 3, wherein the identifier associated with the item name is a secondary menu identifier (ID), the secondary menu ID is associated with a secondary menu, and wherein the method further comprises:
   detecting a selection of the item name on the menu of the first application;
   obtaining the secondary menu ID associated with the item name;
   generating the secondary menu according to the secondary menu ID, wherein the secondary menu comprises a secondary menu item of the second application, the secondary menu item of the second application is obtained from a second correspondence between the second menu item of the second application and the secondary menu ID; and
   displaying the secondary menu on the display unit of the mobile device.

7. The method of claim 1, wherein the first application is executed in an Android™ system equipped in the mobile device.

8. A mobile device, comprising:
   a user interface;
   a display unit;
   a memory; and
   one or more processors coupled with the memory;
   wherein the user interface is configured to:
      receive a request for launching a first application, wherein the first application is configured to be associated with a second application;
   wherein the one or more processors are configured to:
      generate a menu of the first application;
   wherein the display unit is configured to:
      display the menu of the first application;
   wherein the menu of the first application comprises a menu item representing the second application, and in generating the menu of the first application, the one or more processors are configured to:
      add the menu item representing the second application to a preexisting menu of the first application according to a first correspondence between a menu identifier (ID) identifying the preexisting menu of the first application and the menu item representing the second application,
   wherein the first correspondence is configured and stored in the mobile device according to a configuration file provided by the second application when the second application is installed in the mobile device, and
   wherein the configuration file provided by the second application comprises the menu ID for identifying the preexisting menu of the first application.

9. The device of claim 8, wherein the menu item representing the second application comprises an item name.

10. The device of claim 9, wherein the item name in the menu item representing the second application is associated with an identifier for identifying a function of the second application or a secondary menu.

11. The device of claim 10, wherein the item mane in the menu item representing the second application is associated with an icon ID for identifying an icon of the second application.

12. The device of claim 10, wherein the identifier associated with the item name is a function identifier (ID), the function ID is associated with a function of the second application, and wherein the user interface is configured to:

detect a selection of the item name on the menu of the first application;
the one or more processors are further configured to:
obtain the function ID associated with the item name; and
launch the function of the second application associated with the function ID.

13. The device of claim 10, wherein the identifier associated with the item name is a secondary menu identifier (ID), the secondary menu ID is associated with a secondary menu, and wherein the user interface is configured to:
detect a selection of the item name on the menu of the first application;
the one or more processors are further configured to:
obtain the secondary menu ID associated with the item name; and
generate the secondary menu according to the secondary menu ID,
wherein the secondary menu comprises a secondary menu item of the second application, the secondary menu item of the second application is obtained from a second correspondence between the second menu item of the second application and the secondary menu ID; and
wherein the display unit is further configured to display the secondary menu.

14. The device of claim 8, wherein the first application is executed in an Android™ system equipped in the mobile device.

15. A processor used in a mobile communication device that comprises a user interface, a display unit a memory and the processor, wherein the processor is configured to:
in response to a request for launching a first application on the device,
generate a menu of the first application; and
instruct the display unit to display the menu of the first application;
wherein the application is configured to be associated with a second application, and the menu comprises a menu item representing the second application, and wherein in generating the menu of the first application, the processor is configured to:
add the menu item representing the second application to a preexisting menu of the first application according to a correspondence between a menu identifier (ID) identifying the preexisting menu of the first application and the menu item representing the second application,
wherein the correspondence is configured in the mobile device according to a configuration file provided by the second application when the second application is installed in the mobile communication device, and
wherein the configuration file provided by the second application comprises the menu ID for identifying the preexisting menu of the application.

* * * * *